United States Patent [19]

Totsuka

[11] 3,739,923
[45] June 19, 1973

[54] MANIPULATOR

[75] Inventor: Hisao Totsuka, Yokohama, Japan

[73] Assignee: Tokyo Shibaura Denki Kabushiki Kaisha, Kawasaki-shi, Japan

[22] Filed: Feb. 17, 1971

[21] Appl. No.: 116,061

[30] Foreign Application Priority Data

Feb. 20, 1970   Japan.............................. 45/14212

[52] U.S. Cl............................ 214/1 BC, 214/1 CM
[51] Int. Cl............................................... B25j 9/00
[58] Field of Search............ 214/1 BC, 1 BA, 1 CM

[56] References Cited
UNITED STATES PATENTS 3,306,471   2/1967   Devol .............................. 214/1 BC

*Primary Examiner*—Gerald M. Forlenza
*Assistant Examiner*—George F. Abraham
*Attorney*—Robert E. Burns and Emmanuel J. Lobato

[57] ABSTRACT

In a manipulator, a first drive shaft extends from a first actuator means to a first gear case through one of two parallel cylinders of a manipulator arm and is coupled to a second gear case rockably supported by the first gear case via a pair of bevel gears for causing a working head or "hand" of the manipulator arm to undergo a bending or wrist-flexing motion. A second drive shaft extends through the other cylinder from a second actuator means to the first gear case and is coupled to a power cylinder rotatably supported in the second gear case via pairs of bevel gears for causing the aforesaid working head to undergo a swivelling motion. There is further provided a third gear case in which are housed a train of gears for imparting the rotation of the first drive shaft to the entire unit of the second actuator means with which is locked the second drive shaft during operation of the first actuator means only.

5 Claims, 4 Drawing Figures

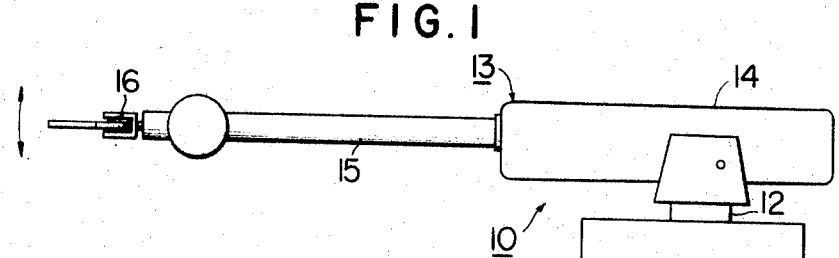
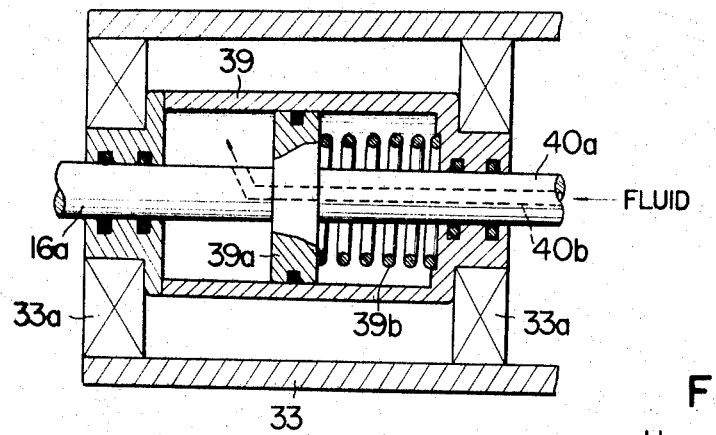
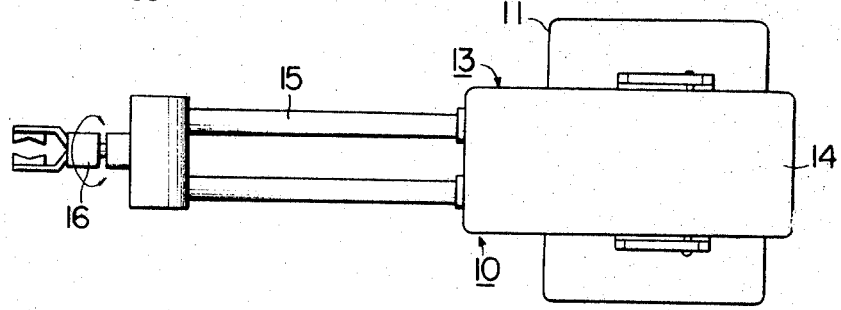

MANIPULATOR

BACKGROUND OF THE INVENTION

This invention relates to mechanical manipulators for applications wherein a number of more or less identical objects are to be handled in a repetitive manner. More specifically, the invention relates to improvements in or relating to such a manipulator designed primarily to add to the simplicity of its control.

There is now an ever accelerating tendency in all modern industries toward automation or "robotization" of their manufacturing or servicing processes as a countermeasure chiefly against the decreasing human resources and increasing labor costs. While its definition is not yet clearly established, the term "robot" seems now to be used to signify all varieties of mechanisms that can perform one, two or an even greater number of simple repetitive jobs while being unattended by operators. The automatic manipulator as one such "robot" should, of course, be made capable of operating in as close a manner as feasible to the manipulatory exercises of human hands. Through analytical study of such manipulatory exercises of human hands, it has been confirmed that the automatic manipulator finds considerably involved as well as variegated work to do when its working head or "hand" is permitted the latitudes of swivelling (or turning), bending or wrist flexing and gripping.

In some prior art manipulators, these three actions have been carried out by means of two drive shafts and one hydraulic cylinder, the two drive shafts being used respectively for the swivelling and bending operations of the working head and the one hydraulic cylinder for the gripping operation thereof. The greatest disadvantage of such conventional manipulators makes its appearance in connection with the two drive shafts used therein in that the bending operation of the working head caused by one of the drive shafts is accompanied by unnecessary rotation of that working head. In order to prevent this unnecessary rotation, it is necessary to introduce an additional signal for its correction together with a control signal to cause the bending operation into a memory device adapted for automatic control of the manipulator, so that the unnecessary rotation of the working head accompanying its bending operation will be counteracted by extra action caused by that additional signal.

SUMMARY OF THE INVENTION

A principal object of the present invention, therefore, resides in the provision of an improved manipulator incorporating a novel device for easy and unfailing prevention of unnecessary rotation of its working head or hand accompanying a bending operation thereof.

In accordance with the invention in one aspect thereof, briefly described, a train of intermeshed gears are provided within a stationary portion of a manipulator arm which includes a hand adapted for direct handling of objects. The first gear of the train of gears is coupled to a first drive shaft extending from a first actuator means inside the stationary portion into a first gear case and being secured to a second gear case rockably supported thereby via a pair of bevel gears thereby to cause a bending operation to the hand which is coupled to a power cylinder accommodated in the second gear case. The last gear of the train of gears, on the other hand, is coupled to the entire unit of a second actuator means from which extends a second drive shaft connected to the power cylinder via at least two pairs of bevel gears thereby to impart a swivelling motion to the hand. Hence, as the first drive shaft is rotated to cause the bending operation to the hand, this rotation is also imparted via the train of gears to the entire unit of the second actuator means with which is locked the second drive shaft during operation of the first actuator means only, so that the resultant undesired rotation of the hand is successfully counteracted by the simultaneous rotation of the second drive shaft.

The invention eliminates the conventionally encountered need of programming extra signals for correction for the above described undesired rotation of the hand of automatic manipulators.

Other objects and advantages of the present invention will appear from the following detailed description with reference to the accompanying drawings which illustrate, by way of example only, a preferred embodiment of the invention, and in which like reference numerals indicate like parts throughout the several figures.

BRIEF DESCRIPTION OF THE DRAWINGS

In the drawings:

FIG. 1 is a side elevational view of a manipulator incorporating the improvements of the present invention;

FIG. 2 is a top view of the manipulator of FIG. 1;

FIG. 4 is an enlarged section showing a finger actuating cylinder.

DETAILED DESCRIPTION OF THE INVENTION

Figure 3:
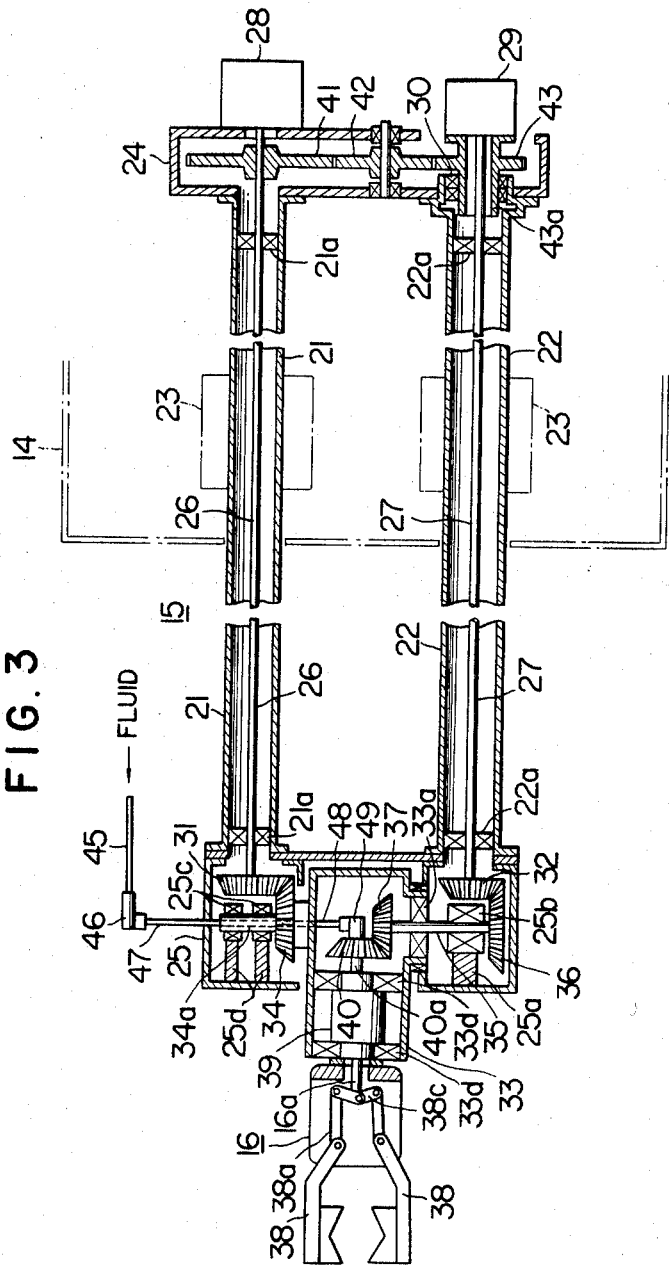
FIG. 3 is a partially broken away, sectional plan view showing the inner details of an arm of the manipulator of FIG. 1 by way of illustration of a preferred form of the improvements of the present invention.

Referring first to FIGS. 1 and 2 of the drawings, reference numeral 10 generally indicates a manipulator incorporating the improvements of the present invention. Generally, this manipulator 10 comprises a cabinet 11 housing various working mechanisms, a column 12 turnably supported within the cabinet 11 and projecting upwardly therefrom, and an arm 13 supported on the top of the turnable column 12 so as to be vertically rockable. This arm 13 comprises a stationary turret 14 supported by the turnable column 12, a movable portion 15 supported by the stationary turret 14 so as to be axially movable, and gripping means comprising a hand 16 adapted for gripping and handling objects and coupled to the outer end of the movable portion 15.

Referring now to FIG. 3 showing in detail the internal mechanisms of the aforesaid movable portion 15 incorporating the improvements of the present invention, two parallel elongated hollow cylinders 21 and 22 disposed partly in the stationary turret 14 are rigidly secured therein to a gear case 24 and are supported by means of a pair of bearings 23 so as to be axially slidable relative to the turret 14. The other ends of the cylinders 21 and 22 are commonly secured to another gear case 25. A drive shaft 26 for effecting a bending operation of the hand 16 is supported by bearings 21a and rotatably installed in the hollow interior of the cylinder 21, while in the interior of the other cylinder 22 there is rotatably installed another drive shaft 27 which is supported by bearings 22a and is used for effecting a swivelling operation of the hand 16. At their ends on the side of the stationary turret 14, the drive shafts 26 and 27 are respectively directly coupled to an actuator 28, which is secured to the gear case 24, and to another actuator 29, which is rotatably supported by a bearing 30 in the gear case 24 through a hub 43a of a gear 43.

The other ends of the drive shafts 26 and 27, on the side of the hand 16, extend into the gear case 25 and are secured to bevel gears 31 and 32, respectively. The bevel gear 31 is in mesh with a bevel gear 34 rigidly secured to a gear case 33, to effect angular movement or a bending operation of the hand 16 about one axis (the vertical axis in FIG. 3). The other bevel gear 32 is in mesh with a bevel gear 36 secured to one end of a shaft 35 rotatably supported in the gear case 25 by a bearing 25b supported by a bracket 25a, the other end of the shaft 35 extending through a bearing 33a into the gear case 33 and being secured to a bevel gear 37 contained within the gear case 33. The bevel gear 34 has rigidly secured thereto a shaft 34a supported in bearings 25c mounted on bracket 25d. The aforementioned bevel gears 34, 37 and 36 are arranged coaxially, and the gear case 33 is angularly movable or rotatable about the common axis of the shafts 34a and 35, i.e. the vertical axis in FIG. 3. The bevel gear 37 is in mesh with a bevel gear 40 mounted on a shaft 40a extending from within a cylinder 39, which is rotatably supported within the gear case 33 by means of bearings 33d and which may be operated pneumatically, hydraulically or electrically for operation of a set of fingers 38 of the hand 16. The cylinder 39 and the gripping means connected thereto are angularly moved or rotated about another axis (the horizontal axis in FIG. 3) in response to rotation of the bevel gear 40. The detail of the cylinder 39 will be described hereinafter.

There are housed within the aforementioned gear case 24 of the stationary turret 14 a gear 41 rigidly mounted on the drive shaft 26 and an intermediate gear 42 in mesh with the gear 41, the aforementioned gear 43 being in mesh with the intermediate gear 42 and being secured to the actuator 29. The gears 41, 42 and 43 comprise compensating means which compensates for the unnecessary swivelling movement of the hand 16 as described hereinafter.

In FIG. 4 there is illustrated an example of the cylinder 39. The cylinder 39 receives therein a piston 39a slidable relative to the cylinder. The piston 39a is rigidly secured on one side thereof to the shaft 40a and on the other side thereof to a shaft 16a pivotally coupled to a toggle link mechanism 38c (FIG. 3). A compression spring 39b resiliently urges the piston 39a to the left as viewed in FIG. 4. A fluid passage 40b extends axially through the shaft 40a and supplies fluid pressure into the left-hand side chamber of the cylinder 39 to urge the piston 39a to the right against the force of the spring 39b. As shown in FIG. 3, the fluid pressure is supplied into the cylinder chamber through a conduit 45, a swivel coupling 46, conduit 47, a hollow passage within the shaft 34a, a conduit 48, a swivel coupling 49 and the passage 40b.

In the bending operation of the hand 16, if the drive shaft 26 extending through the cylinder 21 angularly moved or is rotated clockwise as viewed from the right in FIG. 3 by means of the actuator 28, which may be powered either hydraulically, pneumatically or electrically, the gear case 33 is swung or pivoted via the pair of bevel gears 31 and 34 to bend or pivot or angularly move the hand 16 downwardly about one axis. In this instance, assuming that the bevel gear 37 is kept stationary, the bevel gear 40 in mesh therewith turns clockwise as viewed from the right in FIG. 3 upon downward bending of the hand 16 about one axis, i.e., the downward rocking motion or angular movement of the gear case 33, thereby causing the hand 16 to rotate or angularly move clockwise about the other axis via the cylinder 39. In order to prevent such swivelling rotation of the hand 16 about the other axis, which is not desired in this case, the bevel gear 37 meshing with the bevel gear 40 must be rotated through the same angle as the angle of rotation of the bevel gear 40 accompanying the downward rocking motion of the gear case 33 and in the direction opposite to the rotating direction of this bevel gear 40 to thereby compensate for the undesired movement of the hand 16.

To this end, i.e., for the desired counter rotation of the bevel gear 37 by way of counteraction against the clockwise rotation of the bevel gear 40, the rotation of the drive shaft 26, which is clockwise as viewed from the right in FIG. 3, is transmitted through the train of gears 41, 42 and 43 within the gear case 24, to the body or casing of the actuator 29, thereby causing the same to rotate clockwise as viewed from the right in FIG. 3. The actuator 29 is operable in one mode whereby when same is not operated for the swivelling operation of the hand 16, the output shaft 27 is locked with the body of the actuator 29 and operable in another mode whereby when the actuator 29 is operated, the output shaft 27 thereof is unlocked from the body of the actuator. Because the actuator body is at this time locked with its output shaft 27 the shaft 27 imparts clockwise rotation to the bevel gear 32 and hence counter-clockwise (as viewed from below in FIG. 3) rotation of the bevel gear 37 via the bevel gear 36. The previously mentioned clockwise rotation of the bevel gear 40 being thus counteracted properly, the unnecessary rotation of the hand 16 is successfully prevented.

It will now be clear from the foregoing description that even when both actuators 28 and 29 are operated simultaneously to give bending and swivelling operations to the hand 16, the desired swivelling operation of this hand 16 is not unduly enhanced by the unnecessary rotation of the bevel gear 40 caused by the downward swing of the gear case 33.

Further, when only the actuator 29 is operated to cause the hand 16 to make a swivelling operation only, the rotation of the drive shaft 27 is readily imparted to the hand 16 via the train of bevel gears 32, 36, 37 and 40 since then this drive shaft 27 is not locked with the entire actuator (29) unit which is secured with the gear 43 within the gear case 24.

The gripping operation of the fingers 38 can be carried out by introducing fluid pressure into the chamber of the cylinder 39 through the conduits 45, 47 and the coupling 49 to cause the piston 39a to retract against the force of the spring 39b. The retraction of the piston 39a causes the toggle link mechanism 38c to extend so that the fingers 38 are moved toward each other through links 38a rigidly secured to the fingers 38 to grip an object therebetween. When the fluid pressure is exhausted, the fingers 38 move away from each other by the force of the spring 39b.

Although the automatic manipulator of the present invention has been shown and described in the foregoing in terms of a preferred embodiment thereof, it is understood that the invention itself is not to be limited thereby but is to be interpreted broadly and in a manner consistent with the spirit and scope of the invention.

I claim:

1. A manipulator comprising: a support structure, an arm extending outwardly from said support structure, a manipulator hand support case rockably mounted on one end of said arm to undergo rocking motion about a given axis, a manipulator hand movably mounted on one end of said manipulator hand support case to undergo swivelling motion relative to said support case, first rotary actuator means, second rotary actuator means, a first rotary drive shaft extending interiorly through said arm and connected to be rotationally driven by said first actuator means, a pair of intermeshing bevel gears transmitting rotation from said first drive shaft to said support case to effect rocking motion of said support case and hence said hand about said axis, a second rotary drive shaft extending interiorly through said arms and connected to be rotationally driven by said second actuator means, a third shaft extending transversely to said second shaft and in coaxial relation with said axis, a second pair of intermeshing bevel gears transmitting rotation from said second shaft to said third shaft, a third pair of intermeshing bevel gears transmitting rotation from said third shaft to said hand for effecting the swivelling operation of the latter, and power transmitting means comprising a train of gears including a first gear rigidly mounted on said first drive shaft and a last gear coupled to said second actuator means interconnecting said first drive shaft to said second actuator means to transmit rotary movement of said first drive shaft to said second drive shaft to compensate for unnecessary swivelling motion of said hand which would otherwise occur due to relative rotation between said third pair of bevel gears during the rocking motion.

2. A manipulator as claimed in claim 1, wherein said power transmitting means further comprises an intermediate gear meshing with said first gear and said last gear.

3. A manipulator device comprising: actuable gripping means operative when actuated for releasably gripping an object; first actuating means for actuating said gripping means; means mounting said gripping means to undergo angular movement about two distinct axes; second actuating means operable independently of said first actuating means for effecting oscillatory angular movement of said gripping means about one of said two axes; third actuating means operable in one mode independently of said first and second actuating means for effecting oscillatory angular movement of said gripping means about the other of said two axes and operable in another mode independently of said first actuating means for permitting angular movement of said gripping means about said other axis in response to angular movement thereof by said second actuating means about said one axis; and compensating means mechanically interconnecting said second and third actuating means operative when said third actuating means is in said another mode and operative in response to actuation of said second actuating means for selectively preventing angular movement of said gripping means about said other axis during angular movement thereof by said second actuating means about said one axis thereby compensating for unwanted angular movement of said gripping means which would otherwise occur.

4. A manipulator device according to claim 3, wherein said compensating means comprises motion transmitting means for transmitting output motion from said second actuating means to said third actuating means to effect angular movement of said gripping means about said other axis in one direction to an extent equal to the angular movement thereof about said other axis in the opposite direction thereby preventing any net angular movement of said gripping means about said other axis.

5. A manipulator device according to claim 3, wherein said second actuating means comprises a first rotatable shaft, means interconnecting said first shaft to said gripping means to effect angular movement of said gripping means about said one axis in response to angular movement of said first shaft, and first drive means for angularly driving said first shaft; wherein said third actuating means comprises a second rotatable shaft, means interconnecting said second shaft to said gripping means to effect angular movement of said gripping means about said other axis in response to angular movement of said second shaft and including means operative when said third actuating means is in said another mode for effecting angular movement of said gripping means about said other axis in response to angular movement of said first shaft, and second drive means operable in said one mode for angularly driving said second shaft and operable in said another mode for preventing angular movement of said second shaft relative thereto; and wherein said compensating means includes means for effecting angular movement of said second shaft in response to angular movement of said first shaft to effect a corresponding angular movement of said gripping means about said other axis in a direction effective to compensate for the angular movement of said gripping means about said other axis caused by angular movement of said first shaft.

* * * * *